United States Patent [19]

Hamada et al.

[11] 4,087,399

[45] May 2, 1978

[54] SELF-EXTINGUISHING SILICONE ELASTOMER COMPOSITIONS

[75] Inventors: Mitsuo Hamada; Hiroshi Honma; Shoichi Kato, all of Ichihara, Japan

[73] Assignee: Toray Silicone Company, Ltd., Tokyo, Japan

[21] Appl. No.: 814,509

[22] Filed: Jul. 11, 1977

[51] Int. Cl.$^2$ .............................................. C08L 83/04
[52] U.S. Cl. ........................... 260/37 SB; 260/45.7 R; 260/45.75 F; 260/45.8 NT
[58] Field of Search .................... 260/37 SB, 45.8 NT

[56] References Cited

U.S. PATENT DOCUMENTS

| | | | |
|---|---|---|---|
| 3,629,192 | 12/1971 | Heller et al. | 260/45.8 NT |
| 3,635,874 | 1/1972 | Laur et al. | 260/37 SB |
| 3,652,488 | 3/1972 | Harder | 260/37 SB |
| 3,721,645 | 3/1973 | Zemlin | 260/45.8 NT |

*Primary Examiner*—Lewis T. Jacobs
*Attorney, Agent, or Firm*—Robert L. McKellar

[57] ABSTRACT

A self-extinguishing silicone elastomer containing a curable organopolysiloxane, silica filler, platinum, carbon black, TiO$_2$ and a triazole compound is disclosed.

6 Claims, No Drawings

SELF-EXTINGUISHING SILICONE ELASTOMER COMPOSITIONS

This invention is directed to silicone elastomer compositions with improved self-extinguishing characteristics.

Although silicone elastomers have various excellent characteristics, they are flammable. For this reason, there has been a general demand for silicone elastomers with excellent self-extinguishing characteristics. This demand has become stronger recently with developments in the electric and electronic equipment industries, which are major consumers of silicone elastomers.

Various methods for imparting self-extinguishing properties to silicone elastomers have already been proposed. In some typical methods, platinum or platinum compounds are added to the silicone elastomer. However, because the addition of platinum or platinum compounds alone is not sufficient to give self-extinguishing characteristics to silicone elastomers, platinum use in conjunction with other compounds has been attempted in many studies. For example, titanium oxide or other metal oxides, inorganic compounds, carbon black, azo compounds, etc., are used with platinum or platinum compounds. While these combinations certainly increase the self-extinguishing properties, the increase is not sufficient, and, at the same time, with such additions, the favorable characteristics of silicone elastomers, such as heat resistance, physical properties, and electrical properties are decreased.

In order to solve these problems, the inventors discovered a type of silicone composition which shows improved self-extinguishing properties along with excellent heat resistance, physical properties, and electrical properties.

This invention is related to self-extinguishing silicone elastomer compositions which consist of: (a) 100 parts by weight of a curable organopolysiloxane which contains organic groups directly bonded to silicon atoms, which organic groups are selected individually from methyl, phenyl or vinyl groups such that there are an average of 1.98 to 2.02 such organic groups per silicon atom, the vinyl groups are present in 0 to 2 percent and the phenyl groups are present in 0 to 10 percent based on the number of organic groups in (a); (b) 10–100 parts by weight of finely divided silica; (c) 10–100 parts per million of platinum based on the weight of (a); (d) 0.05–2.0 parts by weight of carbon black; (e) 1–20 parts by weight of fumed titanium dioxide, and (f) 0.05–1.0 parts by weight of a triazole compound.

The organopolysiloxanes used as component (a) of this invention can be homopolymers, copolymers or mixtures of these two, in which the degree of polymerization of the repeating units such as dimethylsiloxane, methylvinylsiloxane or methylphenylsiloxane is 200–5000 or, preferably, 2,000–4,000. These organopolysiloxanes have from 1.98 to 2.02 organic groups per silicon atom, and the number of vinyl groups and phenyl groups in them represent 0–2% and 0–10%, respectively, of the total number of organic groups. The terminating groups on this type of organopolysiloxane may be triorganosiloxy groups, diorganomonohydroxysiloxy groups and diorganomonoalkoxysiloxy groups. There is no particular restriction in this respect. Specific examples of such terminating groups are: trimethylsiloxy, dimethylvinylsiloxy, methylvinylphenylsiloxy and dimethylhydroxysiloxy.

Examples of component (b), the silica fillers which are used in a finely divided form, are fumed silica, precipitated silica, quartz fines and diatomaceous earth. What is meant by "finely divided" for purposes of this invention is a particle size of from 0.001 to 50 microns. They are the known fillers which are usually combined with conventional silicone elastomers. Fillers with untreated surfaces, fillers whose surfaces have been previously treated with organosilanes, organosiloxanes, organosilazanes or other organosilicon compounds, or fillers whose surfaces are treated at the time of the mixing with the above-mentioned treating compounds are equally acceptable.

The amount of silica filler which should be added to component (a) should be 10–100 parts by weight relative to 100 parts by weight of component (a). It is especially desirable to use a powder whose average particle diameter is 0.001–0.05 micron in combination with a powder whose average particle diameter is 0.5–50 micron. When the amount of this type of filler is smaller than the above given range, the silicone elastomer, prepared by the addition of organic peroxides followed by a thermal vulcanization or a radiation vulcanization, show decreased mechanical properties. On the other hand, when the above-described levels are exceeded, the mixing of the components is very difficult, and, the mechanical properties of the silicone elastomers obtained after the vulcanization are decreased.

Component (c), platinum in the amount of 10–100 ppm or, preferably, 20–70 ppm, relative to component (a), as well as components (d), (e) and (f), is indispensible for giving the self-extinguishing characteristics to the silicone elastomers. Finely powdered platinum, finely divided platinum supported on carriers such as alumina, silica gel, asbestos, as well as chloroplatinic acid, or complexes of chloroplatinic acid with alcohols, ethers, aldehydes or vinylsiloxanes may be used as component (c).

In order to produce silicone elastomers with self-extinguishing properties, the platinum or platinum compounds as described above should be homogeneously dispersed in the compositions of silicone elastomers before the compositions are vulcanized. In order to achieve the homogeneous dispersion, they may be dissolved or dispersed in organic solvents such as isopropyl alcohol, ethanol, benzene, toluene, xylene, or in an organopolysiloxane oil.

Examples of carbon blacks that can be used as component (d) are acetylene black and furnace black. It is also desirable that these carbon blacks do not contain sulfur. The proper amount to be added is 0.05–2.0 parts by weight to 100 parts by weight of component (a). When the amount of the addition is below the above-mentioned range, the desired improvement in the self-extinguishing character of the vulcanized silicone elastomers is not achieved. If the amount of the addition is above the range, the electrical properties of the product are unfavorably affected.

Fumed titanium dioxide whose average particle size is smaller than 0.1 micron can be used as component (e). It is added at a rate of 1–20, or, preferably, 3–10 parts by weight per 100 parts by weight of component (a).

Triazole compounds used as component (f) are an especially important component in this invention. Typical examples of such compounds are 1,2,3-triazoles, 1,2,4-triazoles, and benzotriazoles.

Specific examples of 1,2,3-triazoles and their derivatives are: 1-methyl-1,2,3-triazole, 1-phenyl-1,2,3- triazole, 4-methyl-2-phenyl-1,2,3-triazole, 1-benzyl-1,2,3-triazole, 4-hydroxy-1,2,3-triazole, 1-amino-1,2,3-triazole, 1-benzamide-4-methyl-1,2,3-triazole, 1-amino-4,5-diphenyl-1,2,3-triazole, 1,2,3-triazole-4-aldehyde, 2-methyl-1,2,3-triazole-4-carboxylic acid, 4-cyano-1,2,3-triazole and 5-hydroxy-1,2,3-triazole-1-yl acetic acid.

Specific examples of benzotriazoles and their derivatives are: 1-methylbenzotriazole, 5,6-dimethylbenzotriazole, 2-phenylbenzotriazole, 1-hydroxybenzotriazole and methylbenzotriazole-1-carboxylate.

Specific examples of 1,2,4-triazoles and their derivatives are: 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one and 1-phenyl-urazole.

Of all the compounds mentioned above, the benzotriazoles are the most desirable as component (f). Component (f), like component (c), should be homogeneously dispersed in the silicone elastomers in order to produce a product with self-extinguishing properties. For achieving this objective, (f) may be used as a solution in an organic solvent such as isopropyl alcohol, ethanol, benzene, toluene or xylene. When component (f) is present with the above-mentioned components (c), (d) and (e) during the vulcanization of the compositions, the cured silicone elastomers show strikingly improved self-extinguishing characteristics without deterioration of the good heat resistance, physical properties and electrical properties of the ordinary thermosetting type silicone elastomers. The amount of the addition of component (f) should not be above or below the range of 0.05–1.0 parts by weight per 100 parts by weight of component (a). Although this component itself can not act to significantly improve the self-extinguishing properties of the silicone elastomers, it synergistically improves the self-extinguishing character of the product when it is used with components (c), (d) and (e) in the above-mentioned ratios.

The self-extinguishing silicone elastomer compositions of this invention can be produced by a homogeneous mixing of the above-described components (a)–(f) with, two-roll mills, kneader mixers or any other suitable means which gives a homogeneous mixture. In order to obtain the improved self-extinguishing silicone elastomer without sacrificing the good heat resistance, physical properties and electrical properties of ordinary thermosetting silicone elastomers, the above-mentioned compositions are cured by exposure to radiation with a G value of 2.5–3.0, or mixed with some suitable known organic peroxide selected from benzoyl peroxide, 2,4-dichlorobenzoylperoxide, 2,5-bis(t-butylperoxy)-2,5-dimethylhexane, dicumyl peroxide, p-dichlorobenzoyl peroxide, di-t-butylperoxide or t-butylperbenzoate, depending on the uses of the products. The peroxides are combined with the above composition on a two-roll mill and the mixture is thermally cured at 100°–450° C. for about 20 seconds to an hour. If necessary, a post-curing can be carried out. The G value is a measure of efficiency of the radicals in a radiation treatment. G-value is the number of cross-links per 100 electron-volts of absorbed energy. A typical value for a dimethylsiloxane polymer having a viscosity of 10,000 cs. at 25° C., is 1.47.

The self-extinguishing silicone elastomer composition of this invention may contain organopolysiloxanes other than those defined as component (a) of this invention, or may contain organosilanes if desired, as long as the organopolysiloxane contains essentially no hydrogen bonded to silicon atoms. When hydrogen atoms bonded to silicon atoms are present in the composition, the self-extinguishing character decreases, inferior electrical properties and workability result due to foaming, and other decreases in quality result. The composition of this invention may contain the usual nonsiliceous fillers, heat resistance agents, pigments and other additives.

The self-extinguishing silicone elastomers of this invention are quite useful as self-extinguishing elastomer materials for the electric, electronic and machine industries.

This invention will be shown in greater detail with the experimental examples below. In the examples, "part" and "%" are expressed on the basis of weight. In the examples, the testing of the self-extinguishing character was conducted according to the fire retardancy test specified in the Underwriters Laboratory test 94 (UL-94) (vertical). In this test, the silicone elastomer obtained by the curing of the composition with radiation or heating and peroxide is cut to a sample size of 12.7 × 1.27 × 0.2 cm to use as a test specimen. The specimens were hung vertically in a place where there were no air drafts, and was twice exposed to a 1000 BTU/ft$^3$ gas burner flame, 10 seconds each time. In each case the time (seconds) required for the flame to be self-extinguished was measured. 5 specimens were prepared for each sample, and each specimen was exposed twice to the flame. The mean value of the total 10 exposures was considered to be the self-extinguishing character (in units of seconds).

EXAMPLE 1

100 parts of organopolysiloxane uncured rubber (degree of polymerization = 3,000), consisting of 99.8 mol% dimethylsiloxane units and 0.2 mol% methylvinylsiloxane units, 5 parts of dimethylpolysiloxane (degree of polymerization = 10) having hydroxyl groups at both ends, 20 parts of fumed silica with a specific surface area of 200 m$^2$/g were mixed homogeneously in a mill. This mixture then was heat treated at 150° C. for 2 hours and was used as the base compound. To this base compound, 50 parts of quartz powder, 5 parts of fumed titanium dioxide, 0.2 part of a 3% isopropyl alcohol solution of chloroplatinic acid and 0.1 part of carbon black were added. To this mixture, a 30% solution of benzotriazole in isopropyl alcohol was added in various volumes so that the amount of triazole addition could be varied. Thereafter, each mixture was homogeneously blended with a two-roll mill. After a further addition of 0.5 parts of 2,5-bis(t-butylperoxy)-2,5-dimethylhexane paste (purity = 50%), the composition was mixed again with a two-roll mill to prepare a composition for curing.

This composition was pressed into a sheet at 160° C. under 15 kg/cm$^2$ pressure for 10 minutes. The sheet was then thermally cured in a hot-air circulating oven at 200° C. for 4 hours to produce a silicone elastomer. The results of the measurement of the self-extinguishing character of the elastomer product are shown in Table I.

EXAMPLE 2

To 100 parts of the base compound used in Example 1, quartz powder, fumed titanium dioxide, a 3% isopropyl alcohol solution of chloroplatinic acid, carbon black, a 30% isopropyl alcohol solution of benzotriazole and 2,5-bis(t-butylperoxy)-2,5-dimethylhexane, were added in various ratios as shown in Table II, and mixed with a two-roll mill. The self-extinguishing character of the products was tested as described in Example 1.

In addition, silicone elastomers as controls were prepared with chloroplatinic acid as the indispensable component and, in addition, fumed titanium dioxide, carbon black and benzotriazole. The thus prepared control products were also subjected to the self-extinguishing test.

The results for both experimental and comparison samples are shown in Table II.

The sample of Experiment No. 3 proved to be strikingly efficient.

Table I

| Experiment No. | Control | This invention | | |
|---|---|---|---|---|
| | 1 | 2 | 3 | 4 |
| Isopropyl alcohol solution of 30% benzotriazole (parts) | 0 | 0.1 | 1.0 | 3.0 |
| Self-extinguishing character (seconds) | 14.7 | 4.1 | 3.5 | 4.5 |

Table II

| Experiment No. | This invention | Controls | | | | | | | |
|---|---|---|---|---|---|---|---|---|---|
| | 3 | 5 | 6 | 7 | 8 | 9 | 10 | 11 | 12 |
| Base compound (parts) | 100 | 100 | 100 | 100 | 100 | 100 | 100 | 100 | 100 |
| Quartz powder (parts) | 50 | 50 | 50 | 50 | 50 | 50 | 50 | 50 | 50 |
| 2,5-bis-(t-butylperoxy)-2,5-dimethylhexane, 50% paste (parts) | 0.5 | 0.5 | 0.5 | 0.5 | 0.5 | 0.5 | 0.5 | 0.5 | 0.5 |
| 3% solution of chloroplatinic acid in isopropyl alcohol (parts) | 0.2 | 0 | 0.2 | 0.2 | 0.2 | 0.2 | 0.2 | 0.2 | 0.2 |
| Carbon black (parts) | 0.1 | 0 | 0 | 0.1 | 0.1 | 0 | 0 | 0.1 | 0 |
| Fumed titanium dioxide (parts) | 5 | 0 | 0 | 0 | 5 | 5 | 0 | 0 | 5 |
| 30% isopropyl alcohol solution of benzotriazole (parts) | 1.0 | 0 | 0 | 0 | 0 | 0 | 1.0 | 1.0 | 1.0 |
| Self-extinguishing character (seconds) | 3.5 | Completely burned | 40.5 | 35.0 | 15.3 | 12.5 | 27.0 | 25.8 | 7.0 |

That which is claimed is:

1. A self-extinguishing silicone elastomer consisting of
   (a) 100 parts by weight of a curable organopolysiloxane which contains organic groups directly bonded to silicon atoms, which organic groups are selected individually from methyl, phenyl or vinyl groups such that there are an average of 1.98 to 2.02 such organic groups per silicon atom, the vinyl groups are present in 0 to 2 percent and the phenyl groups are present in 0 to 10 percent based on the number of organic groups in (a);
   (b) 10–100 parts by weight of finely divided silica;
   (c) 10–100 parts per million of platinum based on the weight of (a);
   (d) 0.05–2.0 parts by weight of carbon black;
   (e) 1–20 parts by weight of fumed titanium dioxide, and
   (f) 0.05–1.0 parts by weight of a triazole compound.

2. The self-extinguishing silicone elastomer of claim 1 wherein the curable organopolysiloxane (a) is present in 100 parts by weight and has from 200–5,000 repeating siloxane units, (b) is present at 10–100 parts by weight and is composed of silica whose average particle size is achieved by mixing two silicas whose mean particle diameter is 1–50 millimicron and 0.5–50 micron respectively, (c) is present at 20–70 parts per million based on component (a), (d) is present at 0.05–2.0 parts by weight, (e) is present at 3–10 parts by weight and (f) is a benzotriazole and is present at 0.05–1.0 parts by weight.

3. The self-extinguishing silicone elastomer of claim 2 wherein component (b), the silica, is fumed silica.

4. The self-extinguishing silicone elastomer of claim 2 wherein component (c), the platinum, is present as chloroplatinic acid.

5. The self-extinguishing silicone elastomer of claim 2 wherein component (f), the benzotriazole, is 1-methylbenzotriazole.

6. The self-extinguishing silicone elastomer of claim 1 when cured.

* * * * *